(12) United States Patent
Heyne et al.

(10) Patent No.: US 10,923,785 B2
(45) Date of Patent: Feb. 16, 2021

(54) CHARGING STATION FOR AN ELECTRICITY CHARGING STATION HAVING AN UNDERGROUND COOLING ARRANGEMENT

(71) Applicants: Dr. Ing. h.c. F. Porsche Aktiengesellschaft, Stuttgart (DE); ads-tec GmbH, Nürtingen (DE)

(72) Inventors: Raoul Heyne, Wiernsheim (DE); Florian Joslowski, Leinfelden-Echterdingen (DE); Michael Kiefer, Stuttgart (DE); Thomas Speidel, Markgröningen (DE); Matthias Bohner, Stuttgart (DE)

(73) Assignees: Dr. Ing. h.c. F. Porsche Aktiengesellschaft; ads-tec GmbH

( * ) Notice: Subject to any disclaimer, the term of this patent is extended or adjusted under 35 U.S.C. 154(b) by 201 days.

(21) Appl. No.: 16/153,970

(22) Filed: Oct. 8, 2018

(65) Prior Publication Data
US 2019/0106004 A1   Apr. 11, 2019

(30) Foreign Application Priority Data

Oct. 9, 2017 (DE) ...................... 10 2017 217 879.5

(51) Int. Cl.
| | |
|---|---|
| *H01M 10/625* | (2014.01) |
| *H01M 10/613* | (2014.01) |
| *B60L 53/14* | (2019.01) |
| *B60L 53/30* | (2019.01) |
| *B60L 58/26* | (2019.01) |
| *H01M 10/6561* | (2014.01) |
| *H01M 10/627* | (2014.01) |
| *H01M 10/6556* | (2014.01) |
| *H01M 10/6567* | (2014.01) |

(Continued)

(52) U.S. Cl.
CPC .......... *H01M 10/613* (2015.04); *B60L 53/14* (2019.02); *B60L 53/30* (2019.02); *B60L 58/26* (2019.02); *H01M 10/625* (2015.04); *H01M 10/627* (2015.04); *H01M 10/6556* (2015.04); *H01M 10/6561* (2015.04); *H01M 10/6567* (2015.04); *H02J 7/0027* (2013.01); *H01M 10/6569* (2015.04); *H01M 2220/10* (2013.01); *H01M 2220/20* (2013.01); *H02J 7/0042* (2013.01)

(58) Field of Classification Search
CPC ............. H01M 10/613; H01M 10/625; H01M 10/627; H01M 10/6556; H01M 10/6561; H01M 10/6567; H01M 10/6569; H01M 2220/10; H01M 2220/20; B60L 53/14; B60L 53/30; B60L 58/26; H02J 7/0027; H02J 7/0042
See application file for complete search history.

(56) References Cited

U.S. PATENT DOCUMENTS

| | | | |
|---|---|---|---|
| 2005/0202310 A1* | 9/2005 | Yahnker | ................ H01M 2/348 429/62 |
| 2013/0307477 A1 | 11/2013 | Reinschke | |
| 2014/0316630 A1 | 10/2014 | Kohlberger et al. | |

FOREIGN PATENT DOCUMENTS

| | | |
|---|---|---|
| CA | 2648972 A1 | 6/2009 |
| GB | 2460500 A | 12/2009 |
| WO | 2012041902 A2 | 4/2012 |

* cited by examiner

*Primary Examiner* — Raymond Alejandro
(74) *Attorney, Agent, or Firm* — RatnerPrestia

(57) ABSTRACT

A charging station for an electricity charging station having an underground liquid cooling arrangement and a corresponding electricity charging station.

8 Claims, 2 Drawing Sheets

(51) Int. Cl.
*H02J 7/00* (2006.01)
*H01M 10/6569* (2014.01)

CHARGING STATION FOR AN ELECTRICITY CHARGING STATION HAVING AN UNDERGROUND COOLING ARRANGEMENT

CROSS-REFERENCE TO RELATED APPLICATION

This application claims priority to German Patent Application No. DE 10 2017 217 879.5, filed Oct. 9, 2017, the contents of such application being incorporated by reference herein in their entirety.

FIELD OF THE INVENTION

The present invention relates to a charging station having an underground cooling arrangement for an electricity charging station. The present invention also relates to a corresponding electricity charging station.

BACKGROUND OF THE INVENTION

In electrical engineering, any stationary device or electrical system that serves for supplying energy to mobile, battery-operated units, machines or motor vehicles by way of simple setting or insertion without it being necessary for the energy store—for example the traction battery of an electric automobile—to be removed compulsorily is referred to as a charging station. Charging stations for electric automobiles are also sometimes referred to as "electricity charging stations" and can comprise a plurality of charging points.

Known here in particular are direct-current fast charging/high-performance charging (HPC) systems such as the so-called combined charging system (CCS), which is widespread in Europe. In the case of direct-current charging of the generic type, direct current is fed from the charging column directly into the vehicle and, for this purpose, is provided by way of a powerful rectifier from the electricity network or by way of large buffer accumulators at solar charging stations, for example Situated in the vehicle is a battery management system, which communicates with the charging column directly or indirectly in order to adapt the current intensity or to terminate the process when a capacity limit is reached.

The power electronics system is usually located in this case in the charging column. Since the direct-current connections of the charging column are connected directly to corresponding connections of the traction battery, it is thus possible for high charging currents to be transmitted with little loss, which allows short charging times. In the various charging stations used worldwide, a wide variety of cooling systems are used. The positionings of the possible cooling arrangements are also very different.

CA 2648972 and GB 2460500, each of which is incorporated by reference herein, and each of which disclose an electrical charging column for a vehicle having an underground liquid cooling system.

US 2013/0307477 A1, which is incorporated by reference herein, claims a container, which contains all of the electrical components required for charging. The entire container can be located underground and consist of a material that dissipates arising heat underground to the outside. This dissipation can take place through heat transport or through heat convection by means of specific apparatuses. Said heat that is transferred through convection or transport can be dissipated via a further underground space.

US 2014/316630 A1, which is incorporated by reference herein, also describes an electrical charging system for a vehicle having a passive cooling system using a latent heat storage and a method for temperature control of a vehicle.

WO 2012/041902 A2, which is incorporated by reference herein, finally relates to an electrical charging column for a vehicle having an underground electrical installation in the form of a control and switching module, which contains various components such as a protective device, switching device, communication device and measuring device, which are installed below floor level.

SUMMARY OF THE INVENTION

A charging station has an underground cooling, arrangement for electricity charging station and a corresponding electricity charging station.

The approach according to aspects of the invention is based on the finding that the power electronics system has to be cooled in charging stations of a high power. Charging cables having correspondingly high currents likewise have to be liquid-cooled. Furthermore, in charging stations having a buffer store included, which is charged using low network powers and which outputs high powers for charging at electric vehicles, the batteries sometimes have to be, cooled. The cooling unit required for this purpose takes up a relatively large amount of space even in the case of a compact design.

Most known charging columns implement cooling of the power electronics system through air cooling. However, this is possible only when the available installation space is relatively large in order that sufficient space for a flow of air is present in the power electronics system. According to the prior art, cooled charging cables are practically unknown, since vehicles whose charging power would necessitate such cooling are not yet available on the market. Therefore, relevant systems that use liquid cooling arrangements are extremely rare. Liquid cooling arrangements require a large amount of space, but in air cooling arrangements this space is also required for the cooling channels.

An advantage of the liquid cooling arrangement that is integrated in accordance with the invention in this case lies in the ideal installation location thereof, which makes it possible to have a compact design of the charging station in the region thereof that is visible for the user.

BRIEF DESCRIPTION OF THE DRAWINGS

One exemplary embodiment of the invention is illustrated in the drawings and will be described in more detail below. In the drawings.

DETAILED DESCRIPTION OF THE INVENTION

Figure 1:
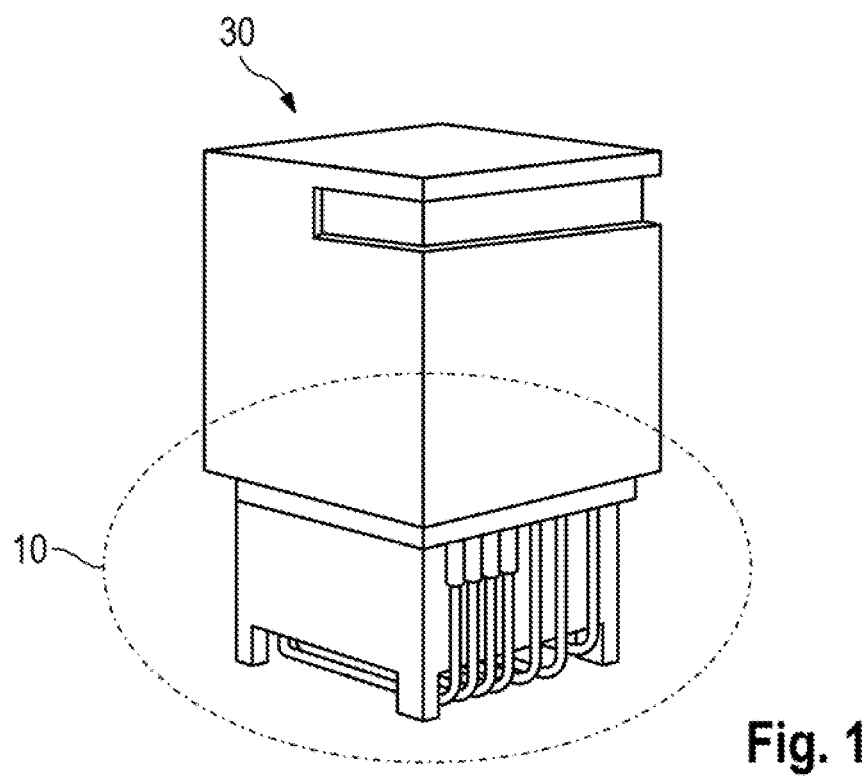
FIG. 1 shows the perspective view of charging station having a housing.
Figure 2:
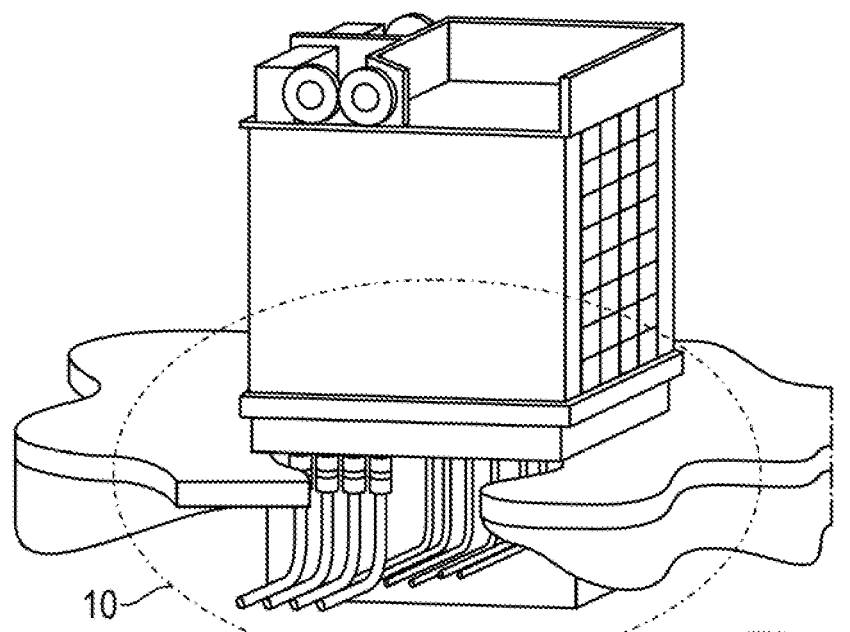
FIG. 2 shows a charging station without a housing, recessed in the ground.

FIG. 1 illustrates the appearance of a charging station (30) according to aspects of the invention having a bottom-side liquid cooling arrangement (10). The purpose of this arrangement is clear from the illustration according to FIG. 2: the entire liquid cooling arrangement (10) is placed in the soil here. The entire bottom is embodied for this purpose as a trough in order that no cooling liquid can escape. There is, so to speak, a basement-like space, which is arranged directly underneath the charging station/power electronics system and which can be part of the foundation. The liquid cooling arrangement (10) is consequently underneath the surface of the earth.

Figure 3:
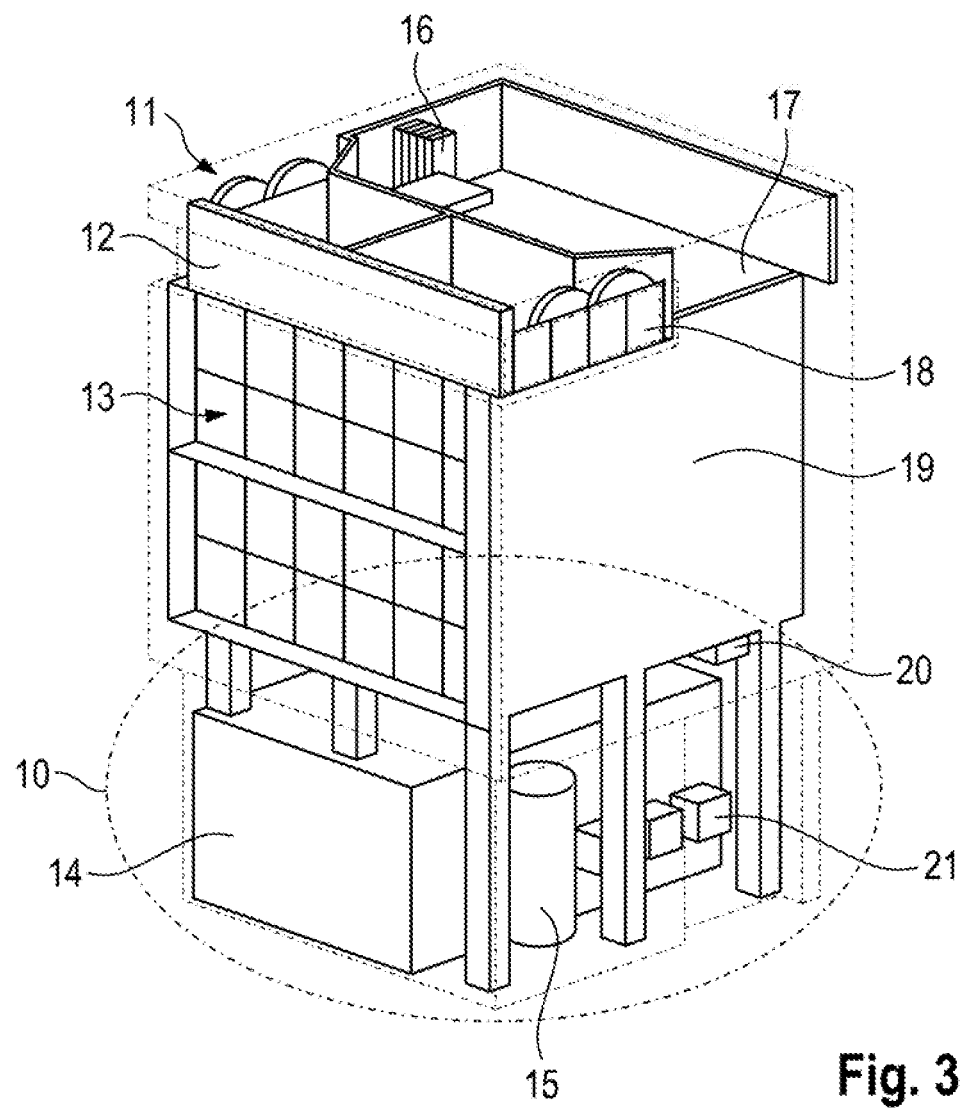
FIG. 3 shows the partially transparent view of a charging station without a housing.

FIG. 3 also shows the other individual components of the charging station (30), which comprise, in particular, a battery (13) having a circulating air region and a power electronics system along with cooling plate (17). Overground air inlet openings (11, 18) are fluidically connected to the air cooling arrangements of the power electronics system and battery (13) and the liquid cooling arrangements of the power electronics system and of the charging cable. The air cooling arrangements are for their part thermally coupled to the liquid cooling arrangement (10) by means of a first heat exchanger (16) and second heat exchanger (20), respectively. Said liquid cooling arrangement is in turn fed by a compressor (15) or a pump from its underground tank (14), which functions as a cold store, and is fluidically connected to an overground condenser or liquefier (12). Three further pumps (21) supply power, in addition to the air cooling arrangements, to a liquid-cooled charging column (not illustrated in the drawings) as well.

What is claimed is:

1. A charging station comprising:
a power electronics system,
a battery,
an air cooling arrangement for each of the power electronics system and the battery;
a first heat exchanger and a second heat exchanger, and
an underground liquid cooling arrangement arranged beneath the battery, wherein the underground liquid cooling arrangement is thermally coupled to the air cooling arrangement of the power electronics system by the first heat exchanger and the underground liquid cooling arrangement is thermally coupled to the air cooling arrangement of the battery by the second heat exchanger.

2. The charging station as claimed in claim 1, wherein the charging station has overground air inlet openings, and
the overground air inlet openings are fluidically connected to the air cooling arrangement.

3. The charging station as claimed in claim 1, wherein the power electronics system has a liquid-cooled cooling plate.

4. The charging station as claimed in claim 1, wherein the charging station comprises pumps for one or more charging columns, the air cooling arrangements and underground liquid cooling arrangements.

5. The charging station as claimed in claim 1, wherein the charging station comprises a space for piping.

6. The charging station as claimed in claim 1, wherein the underground liquid cooling arrangement comprises a tank and a compressor for a cooling liquid.

7. The charging station as claimed in claim 1, wherein the charging station has an overground liquefier, and
the overground liquefier is fluidically connected to the underground liquid cooling arrangement.

8. An electricity charging station having the charging station as claimed in claim 1.

* * * * *